UNITED STATES PATENT OFFICE.

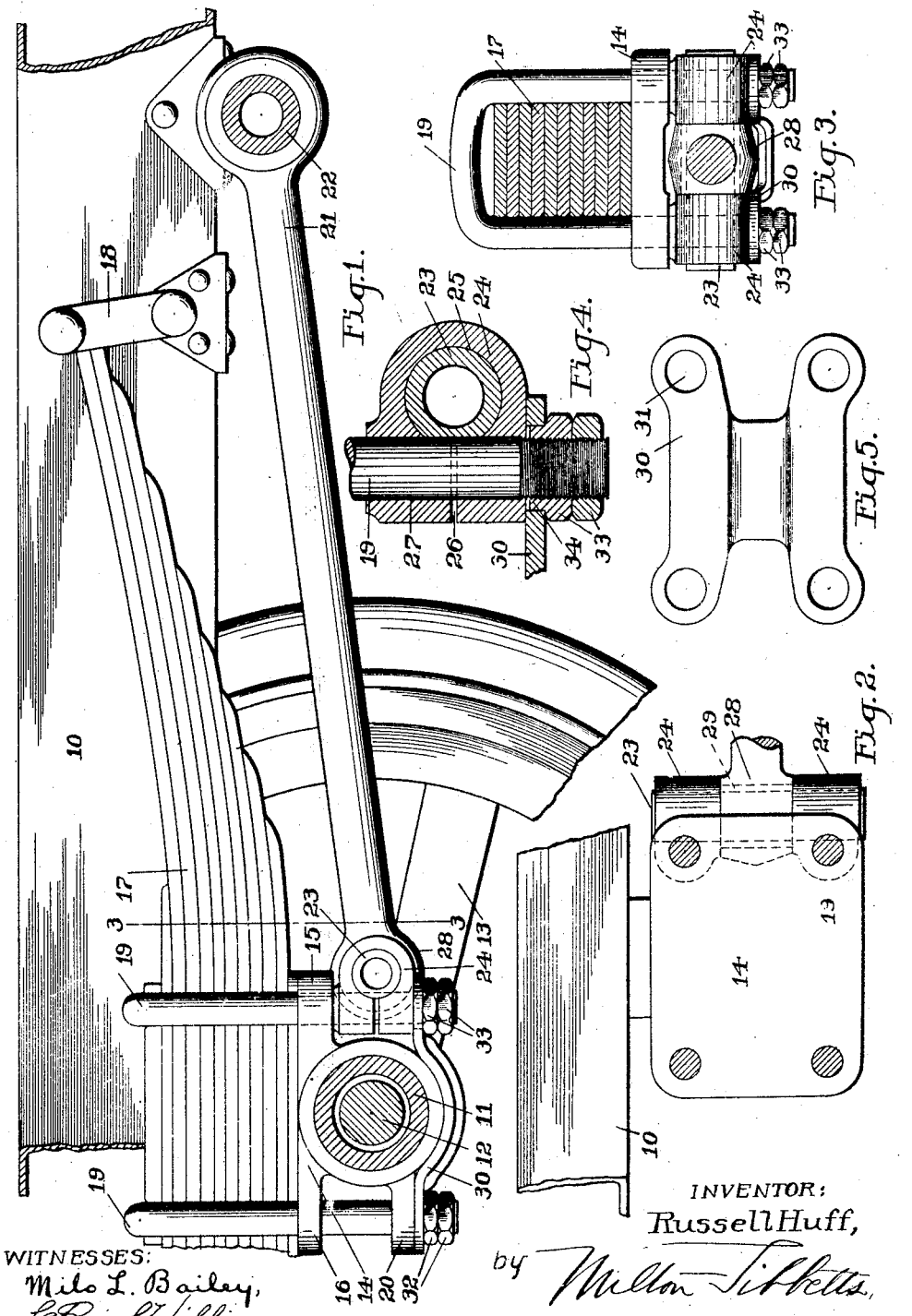

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,218,083.      Specification of Letters Patent.      Patented Mar. 6, 1917.

Application filed March 31, 1913. Serial No. 757,938.

*To all whom it may concern:*

Be it known that I, RUSSELL HUFF, a citizen of the United States, and resident of Detroit, Wayne county, State of Michigan, have invented certain new and useful Improvements in Motor-Vehicles, of which the following is a specification.

This invention relates to motor vehicles, and particularly to the axle and radius or distance rod construction.

The invention is shown in the accompanying drawings as applied to a truck or commercial vehicle.

One of the objects of the invention is to simplify and improve the spring and radius rod connection to the driving axle of a motor vehicle.

The objects and advantages of the invention will be clearly understood from the following description, taken in connection with the drawings which form a part of this specification, and in which, Figure 1 is a side elevation of part of a motor vehicle embodying the invention;

Fig. 2 is a plan view of a part of the frame and axle shown in Fig. 1;

Fig. 3 is a transverse sectional view approximately on the line 3—3 of Fig. 1;

Fig. 4 is a detail sectional view; and

Fig. 5 is a detail view.

Referring to the drawings, 10 represents the side bar of a vehicle frame, and 11 is the stationary axle in which the driving axle section 12 rotates. The wheel 13 is connected to one of the axle sections 12 for driving the vehicle.

A spring pad 14, in the form of lugs 15 and 16, extending forwardly and rearwardly on either side respectively of the axle 11, supports the spring 17, which in turn supports the frame 10 of the vehicle through suitable shackles, as shown at 18. It will be understood that the spring pad 14 is rigidly secured to the axle tube 11, thereby forming a part of said axle.

The spring 17 is secured upon the pad 14 by a pair of inverted U-shaped clips 19, one of which is arranged upon either side of the axle 11. These spring clips extend around the spring and downwardly through openings in the lugs 15 and 16 respectively. The rearward spring clip 19 also passes through a lug 20 which is formed integrally with the spring pad 14.

A radius or distance rod 21 is provided for transferring the drive from the axle 11 to the frame 10. This rod is connected with the frame 10 by any suitable connection, as that shown at 22. The rearward end of the rod 21 is connected to the axle 11 by the pivot pin 23, the connecting pieces 24 and the forward spring clip 19. There are two of these connecting pieces or blocks 24, each of which is formed with an opening 25 to receive the pivot pin 23, and the blocks are split longitudinally of said opening, as shown at 26, for the purpose of clamping the blocks about said pivot pin. Also, the blocks 24 are drilled at right angles to the opening 25, as at 27, this opening 27 being for the purpose of receiving the downwardly extending ends of the forward spring clip 19, as shown particularly in Fig. 4. It will be seen that the blocks 24 are arranged in spaced relation on the forward spring clip 19, and the pivot pin 23 is passed through the openings 25 in the blocks and also through the enlarged end 28 of the distance rod 21. A suitable bushing 29 is provided in the enlarged end of the distance rod for the purpose of taking all of the wear at that point. It will be seen also that the drilled opening 27 slightly intersects the opening 25, so that the shank of the spring clip 19 forms a lock for the pin 23 to hold the same against endwise movement, this construction being best shown in Fig. 4.

A plate 30 of the form shown in Figs. 1 and 5 is placed beneath the axle 11 with the downwardly extending ends of the spring clips 19 extending through the openings 31 in said plate. The nuts 32 are then secured in place on the ends of the rear spring clip 19, whereby this clip and the rearward ends of the plates 30 are firmly secured in place. Then by tightening the nuts 33 on the ends of the forward spring clip 19, said clip, the forward end of the plates 30, and the blocks 24 are firmly secured in place. It will be seen that the blocks 24 form a spacer between the forward end of the plate 30 and the lug 15, and by tightening the nuts 33, the blocks 24 are securely clamped about the pivot pin 23.

For the purpose of preventing the plate 30 from coming in contact with and wearing the threads on the ends of the spring clips 19, the openings 31 in said plates are made somewhat larger than the diameter of the clips 19, and one of the nuts 32 and 33 is formed with an extension 34, which enters the opening 31 and forms a bearing for said plate.

A specific embodiment of the invention has been described in detail, and will be specifically claimed, but it should be understood that the invention is not limited to the exact details of construction shown, as it will be apparent that changes may be made without departing from the spirit or scope of the invention.

Having thus described my invention, what I claim and desire to secure by Letters Patent is:

1. In a motor vehicle, the combination with the frame and the axle having a spring pad thereon, of a distance rod connected at its forward end to the frame, a pair of separated blocks independently secured to said spring pad, and a connection between the rear end of said rod and said blocks.

2. In a motor vehicle, the combination with the frame and the axle having a spring pad thereon, of a distance rod connected at its forward end to the frame, a pair of separated blocks secured to said spring pad, and a pivot pin clamped in said blocks and extending through the rear end of said distance rod.

3. In a motor vehicle, the combination with the axle, the spring seated on the axle, and a clip securing said spring to the axle, of a distance rod, and a connection between said distance rod and said axle comprising a block secured to the axle by said spring clip.

4. In a motor vehicle, the combination with the axle, the spring seated thereon, and a U-shaped clip securing said spring to the axle, of a distance rod, a connection between said distance rod and said axle comprising a pair of blocks secured to the axle by said spring clip, and a pin passing through said blocks and said distance rod.

5. In a motor vehicle, the combination with the axle, the spring seated thereon, and a pair of spring clips securing said spring to the axle, one of said clips being arranged on either side of said axle, of a distance rod, and a connection between said distance rod and said axle comprising a block, a plate, means including said spring clips for securing said plate and block to the axle, and a pivot pin between said block and said distance rod.

6. In a motor vehicle, the combination with the axle, having a spring seat extending transversely thereof, a spring on said seat extending transversely of the axle, an inverted U-shaped spring clip on either side of said axle extending around said spring and through openings in said spring seat, a block on each of the arms of one of said spring clips, a plate extending beneath the axle and having openings to receive the downwardly extending arms of both of said spring clips, and nuts on the ends of said spring clips for securing all of the parts together, of a distance rod pivoted to said block and having a connection at its forward end to the vehicle frame, and a radius rod connection comprising a block having drilled openings arranged at right angles to each other, said block being split transversely of one of said openings and longitudinally of the other said opening.

7. In a motor vehicle, the combination with the axle, and the radius rod, of a connection between the axle and radius rod comprising a block pivoted to said radius rod, said block being split longitudinally of said pivotal connection, and means for securing said block to the axle, and simultaneously clamping the block about its pivot pin.

8. In a motor vehicle, the combination with the axle and the distance rod, of a connection between said axle and distance rod comprising a block having an opening therethrough, said block being split longitudinally of the opening, a pivot pin in said opening, said radius rod being mounted upon said pivot pin, and means for securing the block to the axle and simultaneously clamping it about said pivot pin.

9. In a motor vehicle, the combination with the axle and the distance rod, of a spring clip securing the spring to the axle, a pair of separated split blocks arranged on the stems of said spring clip, a pivot pin passing through openings in said blocks, said distance rod having pivotal connection with said pin, and means for securing said spring clips in place and simultaneously clamping said blocks about said pivot pin.

In testimony whereof I affix my signature in the presence of two witnesses.

RUSSELL HUFF.

Witnesses:
LE ROI J. WILLIAMS,
MILO L. BAILEY.